APPARATUS FOR THE TREATMENT OF TEXTILES OR FABRICS OR THE WASHING OF LAUNDRY

Original Filed March 8, 1965 4 Sheets-Sheet 1

United States Patent Office

Re. 26,874

Reissued May 12, 1970

26,874

APPARATUS FOR THE TREATMENT OF TEXTILES OR FABRICS OR THE WASHING OF LAUNDRY

Konrad Schäfer, 8 Schoppingstr., Munich 60, Obermenzing, Germany

Original No. 3,330,139, dated July 11, 1967, Ser. No. 437,884, Mar. 8, 1965. Application for reissue May 1, 1969, Ser. No. 830,891

Int. Cl. D06f *37/08*

U.S. Cl. 68—58 16 Claims

Matter enclosed in heavy brackets [ ] appears in the original patent but forms no part of this reissue specification; matter printed in italics indicates the additions made by reissue.

This invention relates to apparatus for the treatment of textiles or fabrics, or the washing of laundry, in which the material to be treated is advanced intermittently through a succession of treatment chambers in counterflow to a treatment or washing liquid. Such apparatus is referred to herein as apparatus of the kind specified.

In one known machine of this kind a number of separate drums, in each of which one operational process takes place, are fixed to a rotatable shaft, each drum being subdivided by inclined plates; when the machine is rotated in one direction the material being treated in each drum falls from one inclined plate to the next, whereas when the machine is rotated in the opposite direction the material is transferred from one drum to the next adjacent drum. Although the drums of this machine are arranged next to one another as a single unit, the internal arrangement of the machine, and especially the protruding parts and plates, give rise to the risk of damage to the material being washed or treated. The inclined plates cause considerable friction on the material, the more so as the latter cannot be prevented from running dry. Furthermore, the machine is expensive in construction since intermediate chambers must be provided for controlling the passage of material from one drum to the next.

It is an object of the present invention to provide a simpler construction of such a machine in which the above disadvantages are substantially eliminated. Apparatus in accordance with the invention comprises a rotatable drum having a substantially horizontal axis and divided axially into a plurality of compartments or treatment chambers, each compartment being formed with an opening adapted to be brought into register with an opening in an adjacent compartment, and the openings being disposed so that the material being treated is transferred by gravity between the compartments when the drum is rotated to a particular angular position. Thus the drum may be split by a plane passing through its axis into two drum portions which are axially slidable relatively to one another. Alternatively, the openings may be formed in the dividing walls between the compartments and controlled by hinged closure members which are inclined in their open positions to provide chutes for facilitating the transference of the material.

It may be advantageous to incline the apparatus slightly so as to facilitate the flow of treatment or washing liquid. Alternatively, the individual compartments or treatment chambers may have independent feeds for the treatment or washing liquid, and for this purpose the compartments may be axially spaced to provide therebetween spaces into which the liquid is introduced, the compartment walls on either side of the spaces being at least partially perforated. The perforations in these walls can be so arranged that the treatment liquid, enriched if necessary with chemicals, can be forced forward under pressure.

Several embodiments of the present invention will now be described by way of example with reference to the accompanying drawings in which.

Figure 1:
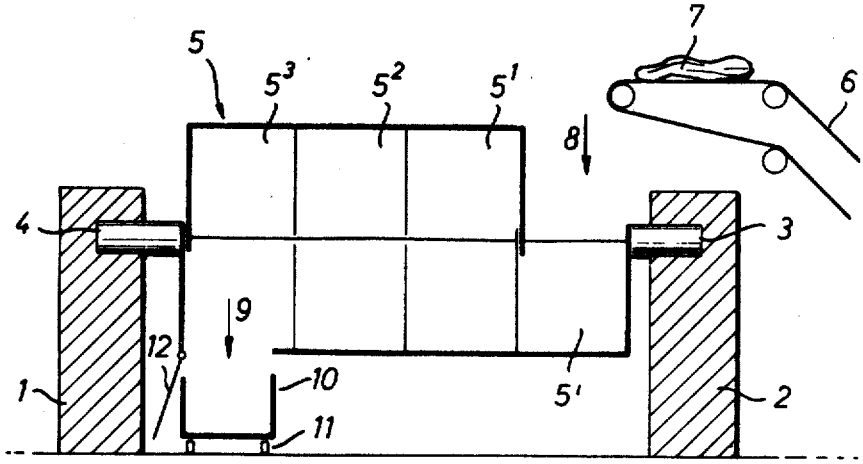
FIGURE 1 is a longitudinal section through one apparatus in accordance with the invention.

The apparatus shown in FIGURE 1 comprises a drum 5 mounted in bearings 3, 4 carried by bearing members 1 and 2, the drum being rotatable about its axis by any suitable driving means. The axis of the drum is arranged horizontally or substantially horizontally. The drum is divided axially into three compartments or treatment chambers $5^1$, $5^2$, and $5^3$, and is split by a plane passing through its axis to form two relatively slidable drum portions. The lower drum portion has an additional reception chamber 5' into which laundry 7 or other material to be treated is fed by a conveyor 6, the material being dropped in the direction indicated by the arrow 8 when the drum is in the position shown. Under certain circumstances it is necessary to moisten the material 7 before its introduction to the drum, and it may be desirable to press it in order to reduce its volume. When the drum is stationary, the treated material can be discharged from the final compartment $5^3$, as indicated by the arrow 9, into a carrier 10 running on casters 11. This carrier may be replaced by a conveyor belt similar to the conveyor 6. The discharge opening of the compartment $5^3$ is normally closed by a hinged closure member 12.

In use of the apparatus, after the reception chamber 5' has been loaded, the upper drum portion is slid axially to the right through a distance of one compartment's width so that the upper half of compartment $5^1$ lies above the reception chamber 5'. The lower half of the compartment $5^3$ is now open. The drum is now rotated and separate treatments are performed in the treatment chambers $5^1$, $5^2$ and $5^3$. At the end of the treatment the drum is stopped so that the positions of the drum portions shown in FIGURE 1 are reversed, and the drum portion which is now in the lower position is slid to the left. The drum is now rotated through half a revolution to the position shown in FIGURE 1, the material in each compartment thus being transferred by gravity to an adjacent compartment. The closure member 12 is opened and the contents of compartment $5^3$ discharged.

Figure 2:
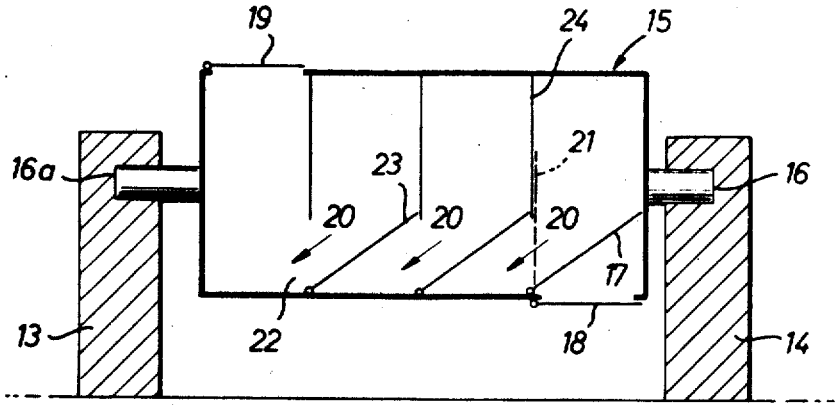
FIGURE 2 is a longitudinal section through another apparatus.

In the construction illustrated in FIGURE 2, the drum 15 is rotatable on bearings 16, *16a* carried by bearing members 13, 14. The drum is divided axially to provide four compartments or treatment chambers. The compartments are separated by dividing walls 24 each having in its lowermost portion an opening 22 adapted to be closed by a hinged closure member 17. In its closed position, each closure member 17 lies flat against the wall 24, as indicated for one closure member at 21, so as to minimise the risk of damage to the material by protrusion of the free edge 23 of the closure member.

In use of the apparatus, the drum is rotated to a position 180° distant from that shown in the figure, and material is introduced into the first compartment via an opening normally closed by a hinged closure member 18. At the end of the first treatment the drum is stopped and the closure members 17 are opened.

The drum is next rotated through 180° to the position illustrated, in which the members 17 form inclined chutes which facilitate the transference of the material under gravity in the direction of arrows 20. Prior to the next treatment the closure members 17 are closed; the drum is rotated through a further half revolution and the closure members 18 and 19 are opened to permit the introduction of fresh material into the first compartment and the extraction of treated material from the last compartment. The members 17 have a substantially larger area than the openings 22 in the walls 24, which may be recessed to accommodate the edges 23 of the closure members and thereby provide a flush fit. This construction provides an additional compartment beyond those needed for the actual treatment stages. The integral construction of the drum has the advantage that it can easily be kept liquid-tight, since there are no relatively sliding parts which call for special precautions to prevent leakage. The movement of the closure members 17 should be effected so that there is no risk of tearing or otherwise damaging the material under treatment; the rotation of the drum through half a revolution while the closure members are in the course of opening should of course take place very slowly.

Figure 3:
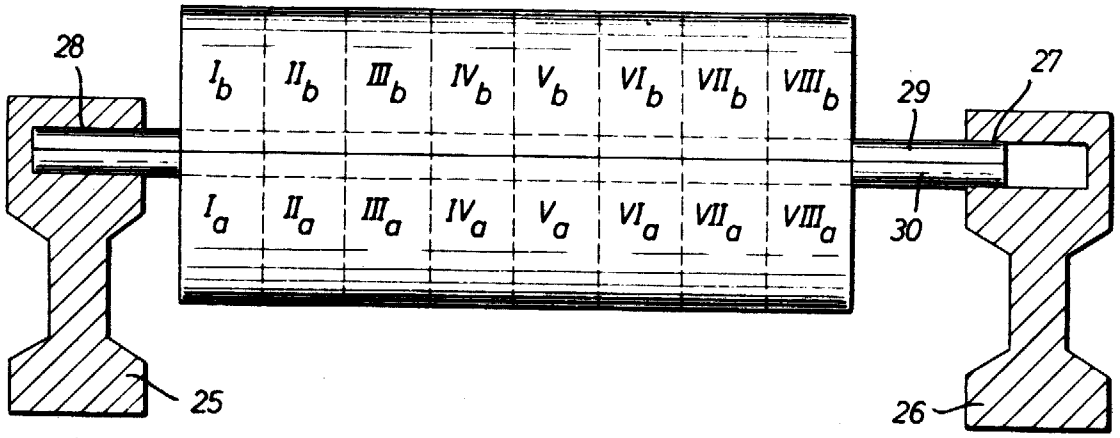
FIGURES 3 and 4 are part-sectional elevations of a third apparatus shown in two operative positions respectively.
Figure 4:
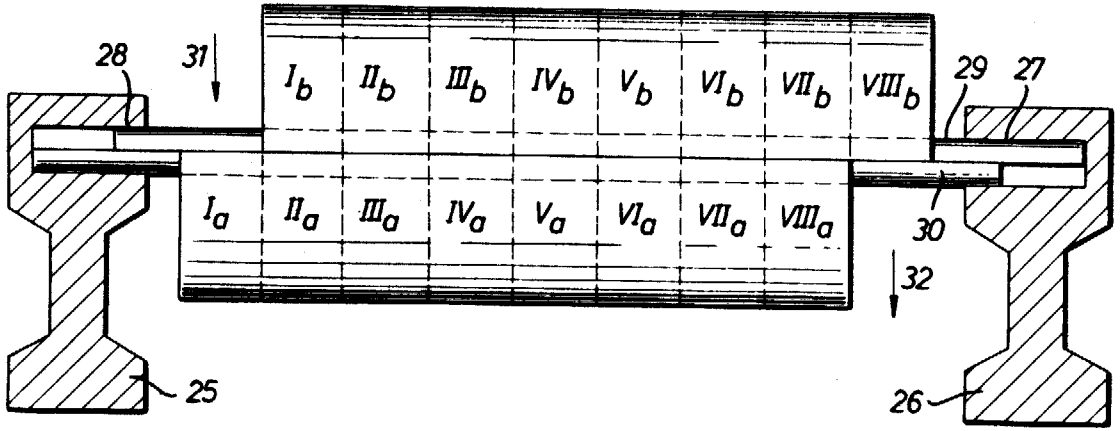

Referring now to FIGURES 3 and 4, the drum is divided into eight compartments or treatment chambers I–VIII. In these chambers the following treatments are performed, by means of treatment liquids which are caused to flow in the opposite direction to the progressive movement of the material under treatment:

I—Softening up.

II–III—Preliminary washing.

IV–V—Washing clean, preferably with steam and detergents.

VI—Rinsing. A small proportion of the rinsing liquid may be led directly to compartment III.

VII—Rinsing, with addition of soft water.

VIII—Further rinsing with addition of hard water.

The drum comprises two relatively slidable portions which in FIGURE 3 are shown in their normal working position, i.e. each chamber, now closed, can carry out its appropriate washing operation. In order to introduce fresh material and to discharge treated material, and also to transfer partially treated material from one compartment to the next, it is necessary to slide the drum portions axially relatively one to the other as illustrated in FIGURE 4. The drum portions are carried by a split shaft formed in two relatively slidable parts 29, 30, which run in bearings 27, 28 carried by bearing members 25, 26. The limit of relative axial movement of the shaft parts is one compartment's width. The material is introduced in the direction of arrow 31 into compartment Ia as shown in FIGURE 4, and material is discharged from the compartment VIIIb in the direction of arrow 32. If it is required to rinse in hard water or to starch the material, water is fed to chamber VII either continuously or intermittently.

Figure 5:
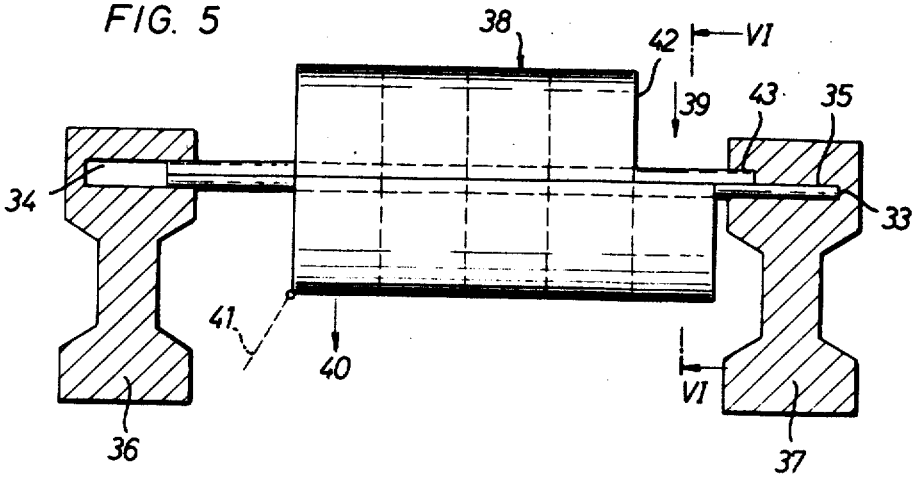
FIGURE 5 is a part-sectional elevation of a fourth apparatus.

The construction illustrated in FIGURE 5 differs from that of FIGURE 1 in that the upper and lower drum portions are mounted on respective halves of a split shaft 43, 33. The ends of the shaft are rotatable in bearings 34, 35 carried by bearing members 36, 37. The shaft portion 43 is fixed axially although it can be rotated with the other shaft half. The lower drum portion comprises four half-compartments. The material is introduced into the drum in the direction of the arrow 39 and is discharged from the last compartment in the direction of the arrow 40 when a normally closed closure member 41 is opened.

Figure 6:
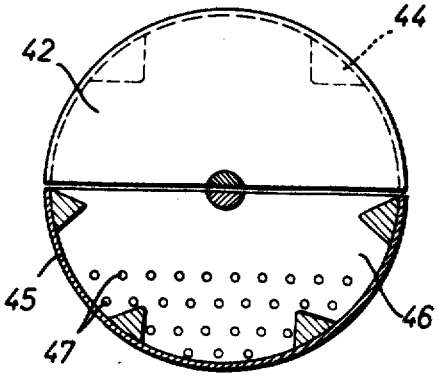
FIGURE 6 is a cross-section along line 6—6 of FIGURE 5.

FIGURE 6 is a cross-section of the drum showing the fixed end wall 42 of the upper drum portion. The drum compartments in all the constructions described above have axially extending ribs 44 which turn or tumble the material when the drum is rotated.

FIGURE 6 also shows the dividing wall 46 between the first and second compartments, which dividing wall has perforations 47 to allow the washing and rinsing fluids to pass. The individual dividing walls in the lower drum portion 45 are firmly fixed since they have to be moved with the sliding of the drum so as to bring the lower part of each compartment into co-operative engagement with the upper part of an adjacent compartment.

Figure 7:
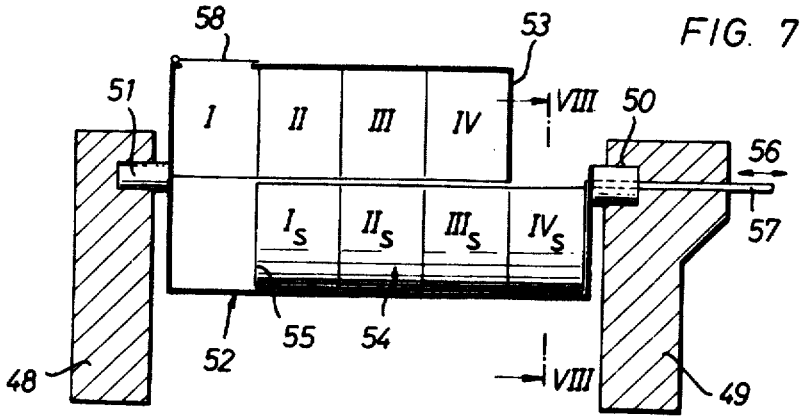
FIGURE 7 is a longitudinal section of a fifth apparatus.
Figure 8:
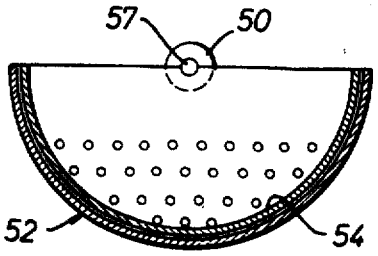
FIGURE 8 is a cross-section along line 8—8 of FIGURE 7.

The construction illustrated in FIGURE 7 differs from that in FIGURE 5 only insofar as the individual drum portions do not slide one relatively to the other, but one drum portion includes a tank 54. The two drum portions 52, 53 are adapted to rotate together in bearings 50, 51 carried by bearing members 48, 49. The drum portion 52 is constructed one compartment's width longer than the other portion 53. Inside the portion 52 is a tank, FIGURE 8, adapted to slide axially. This tank contains four compartments $I_s$ to $IV_s$ with a fixed end wall 55. By means of an axial rod 57 the tank 54 can be displaced in the direction indicated by arrow 56 by a distance of one compartment's width. The material to be treated is introduced into the compartment $IV_s$ and the tank is moved through one chamber's width to the left so that the two groups of four half-compartments coincide. Compartment I has an opening for discharging the contents, which opening is normally closed by a hinged closure member or discharging door 58. It will be appreciated that the discharging of material from this particular construction of apparatus cannot be effected simultaneously with the introduction of the material into the drum, but a half-revolution of the drum is necessary after the half-compartments I and $I_s$ are brought into register. The apparatus must therefore be operated so that after the treatment is completed the drum is stopped, the discharging door 58 is opened, the contents are removed and the drum is then rotated through a further half-revolution. The tank is then slid a compartment's width to the right by means of the rod 57 and the compartment $IV_s$ is ready for loading.

Figure 9:
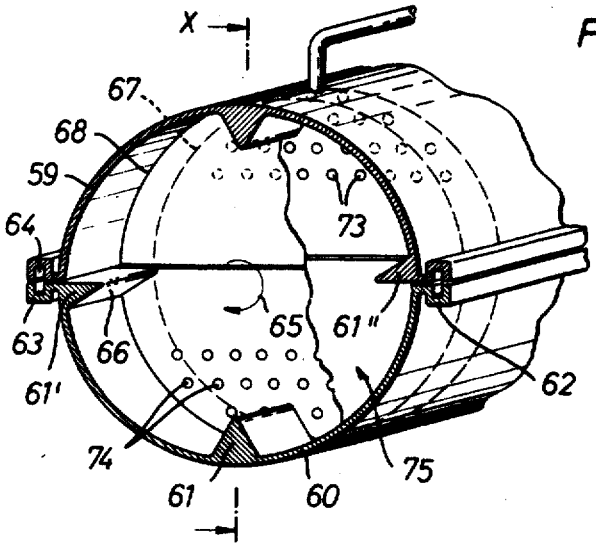
FIGURE 9 is a fragmentary perspective view, partly in section of a drum of one apparatus referred to above.

FIGURE 9 illustrates a typical drum construction. The two drum portions 59 and 60 can be made capable of sliding axially with respect to one another. The lower portion 60 has two ribs 61 fixed firmly on the wall of the drum. The arrangement of these ribs will be later described. The two drum portions have laterally protruding flanges 62 and 63 which enclose corresponding rails or bars 64, which are attached either to drum 59 or drum 60. In attaching the rails or bars to the drum portions care must be taken to ensure that the two portions of the drum can slide relatively without hindrance.

If for example the drum is rotating in the direction of arrow 65, then the rib 61' at the junction of the two portions serves as a packing to prevent the treatment fluid applying pressure to the joint and escaping. It should be stated that the speed of rotation of the unit should be about one revolution per second so that the centrifugal pressure is not too great. Similarly, the rib 61'' is attached to the upper drum portion 59 for the same purpose.

FIGURE 9 also shows the construction of the individual dividing walls.

Figure 10:
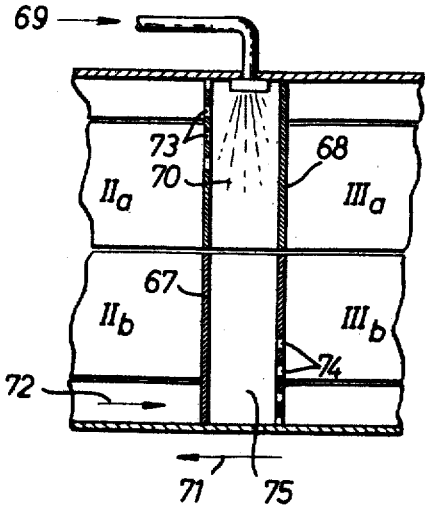
FIGURE 10 is a fragmentary section on line 10—10 in FIGURE 9.

In order to maintain the principle of the counter-flow it has been found useful, as shown in FIGURE 10, to form two parallel dividing walls 67 and 68, separated by a small space. These parallel walls separate chambers II and III and define an intermediate space 75 arranged to receive a treatment fluid 70, from a supply pipe 69. The intermittent forward movement of the material is in the direction of arrow 71, whereas the general direction of the treatment fluids is indicated by arrow 72. Although it suffices to arrange the unit perfectly horizontally, as the movement of the fluids exerts but little pressure, the whole machine may be very slightly inclined. It is therefore essential to take care that the flow of treatment fluids takes place only in the direction of arrow 72. This may be effected by making perforations 73 on one half only of wall 67 whereas the corresponding wall 68 is perforated only on the diametrically opposed half as shown at 74. Thus the fluid first enters the intermediate space through the perforations 73, additional fluids being added here if desired, and then, after a drum rotation of 180°, enters chamber III through the perforations 74.

As already stated, additional chemicals, or even steam, can thus be passed to the individual chambers. For this purpose inlet-leads can be fixed to the chambers, adapted for whatever material, steam, hot water, cold water, or chemicals it is desired to add. These supply-leads can be fixed to an end of the drum or unit, so that an absolutely water-tight connection can be made; supply of material may be automatic, by generally known methods, and the periods when the unit is necessarily at a standstill will be used for supplying treatment material.

With this invention it is possible to produce a better cleansing effect in an appreciably shorter time. Also, this machine works with a smaller expenditure of treatment fluid than the well-known double-drum washing machines. Moreover, the effect of heat-rays is less than with conventional machines.

I claim:

1. Apparatus for the treatment of textile goods in which material to be treated is advanced intermittently through a succession of treatment chambers in counter-flow to a treatment liquid, said apparatus comprising a rotary drum having a horizontal axis and mounted for rotation about said axis, said drum being partitioned axially into a plurality of separate treatment chambers in which successive treatment stages are performed, each said chamber having an inlet opening through which the material is received and an outlet opening through which the material is discharged, fluid supply means for supplying treatment liquid to said chambers, and movable transfer means operable at the end of each treatment stage to inter-connect said inlet and outlet openings of adjacent treatment chambers for effecting transfer of the material between successive chambers when the drum is rotated to a predetermined angular position.

2. Apparatus for the treatment of textile goods in which material to be treated is advanced intermittently through a succession of treatment chambers in counter-flow to a treatment liquid, said apparatus comprising a rotary drum having a horizontal axis, said drum being mounted for rotation about said axis, partition means dividing said drum into a plurality of axially spaced treatment chambers, including respective end chambers and at least one intermediate treatment chamber, each treatment chamber having an opening therein adapted to be brought into co-operative relationship with an opening in an adjacent chamber for the passage of said material therethrough, means for supplying material to be treated to one said end chamber, means for discharging the treated material from the other said end chamber, fluid supply means for supplying treatment liquid to said chambers, and movable means for bringing said openings of adjacent chambers into co-operative relationship, said drum being rotatable about its axis to a predetermined angular position whereby to effect transfer of the material by gravity between the chambers through said openings.

3. Apparatus for the treatment of textile goods in which material to be treated is advanced intermittently through a succession of treatment chambers in counter-flow to a treatment liquid, said apparatus comprising a cylindrical drum having a horizontal axis, means mounting said drum for rotation about said axis, said drum being partitioned axially into a plurality of separate treatment chambers, means for supplying treatment liquid to said chambers, said partitioned drum consisting of a pair of complementary hemi-cylindrical drum portions, one said drum portion being axially slidable relatively to the other drum portion between a first axial position at which said treatment chambers are isolated from one another and a second axial position at which one half of each chamber is in registration with the complementary half of an adjacent chamber.

4. Apparatus for the treatment of textile goods in which material to be treated is advanced intermittently through a succession of treatment chambers in counter-flow to a treatment liquid, said apparatus comprising a cylindrical drum mounted for rotation about a horizontal axis, partition means dividing said drum axially into separate treatment chambers of equal axial dimensions, and fluid supply means for supplying treatment liquid to said chambers, said partitioned drum being split in a plane containing said axis and consisting of two complementary hemi-cylindrical drum portions, one said drum portion being axially displaceable relatively to the other drum portion through a distance equal to the axial length of a said treatment chamber.

5. Apparatus according to claim 4, wherein the partition means comprises axially spaced pairs of perforate dividing walls, the two walls of each pair being perforated and defining therebetween a space to which treatment liquid is supplied.

6. Apparatus according to claim 5, wherein the perforations in each pair of dividing walls on either side of said space are set in diametrically opposed halves for providing an intermittent passage of the treatment liquid.

7. Apparatus for the treatment of textile goods in which material to be treated is advanced intermittently through a succession of treatment chambers in counter-flow to a treatment liquid, said apparatus comprising a cylindrical drum having a horizontal axis, said drum being mounted between end bearings for rotation about said axis, said drum consisting of two complementary hemi-cylindrical drum portions each of which is partitioned axially to provide therein a series of hemi-cylindrical compartments, the compartments of said drum portions co-operating in pairs to form respective treatment chambers, one said drum portion including at one end a further hemi-cylindrical compartment adapted to receive material to be treated, and at the other end means for discharging treated material from the last compartment, and fluid supply means for supplying treatment liquid to said treatment chambers, one said drum portion being axially slidable relatively to the other drum portion so that each said compartment therein is adapted to cooperate alternatively with two adjacent compartments in the other portion.

8. Apparatus for the treatment of textile goods in which material to be treated is advanced intermittently through a succession of treatment chambers in counter-flow to a treatment liquid, said apparatus comprising a rotary shaft mounted between end bearings for rotation about a horizontal axis, said shaft consisting of two complementary hemi-cylindrical shaft portions, a cylindrical drum mounted coaxially on said shaft for rotation therewith, partition means dividing said drum axially into separate treatment chambers of equal axial dimensions, and fluid supply means for supplying treatment liquid to said chambers, said partitioned drum being split in a plane containing said shaft axis and consisting of two complementary hemi-cylindrical drum portions each secured to a respective shaft portion, one said shaft portion being axially slidable in said end bearings relatively to the other shaft portion through a distance equal to the axial length of a said treatment chamber.

9. Apparatus for the treatment of textile goods in which material to be treated is advanced intermittently through a succession of treatment chambers in counter-flow to a treatment liquid, said apparatus comprising a rotary drum having a peripheral wall, said drum being mounted between end bearings for rotation about a horizontal axis, partition means dividing said drum axially into a plurality of separate treatment chambers, including respective end chambers and intermediate chambers between said end chambers, said peripheral wall having a first aperture therein through which the material to be treated is admitted to one said end chamber and a second aperture through which the treated material is discharged from the other said end chamber, first and second movable closure members connected to said peripheral wall for controlling said apertures, and fluid supply means for supplying treatment fluid to the treatment chambers, said partition means comprising a plurality of axially spaced dividing walls having respective aligned aperture therein adjacent said peripheral wall, and a hinged closure member for each said aperture, each hinged closure member being movable between a first position on which it closes its respective aperture and a second position in which it is inclined for guiding material through said aperture when the drum is rotated to a predetermined angular position.

10. Apparatus according to claim 9, wherein said first and second apertures through which the material is admitted and discharged are positioned on diametrically opposite sides of said peripheral wall.

11. Apparatus for the treatment of textile goods in which material to be treated is advanced intermittently through a succession of treatment chambers in counterflow to a treatment liquid, said aparatus comprising a rotary shaft mounted between said bearings for rotation about a horizontal axis, said shaft comprising two complementary hemi-cylindrical shaft portions, a drum mounted on said shaft for rotation therewith, partition means dividing said drum axially into a series of separable treatment chambers, and fluid supply means for supplying treatment fluid to said chambers, said drum being split in a plane containing the shaft axis and consisting of a first drum portion having a series of compartments and a second drum portion having a series of complementary compartment and a further compartment at one end to receive material to be treated, one said shaft portion being axially slidable in its bearings whereby the compartments in the first drum portion are each adapted to register with either of two adjacent compartments in the second drum portion.

12. Apparatus for the treatment of textile goods in which material to be treated is advanced intermittently through a succession of treatment chambers in counterflow to a treatment liquid, said aparatus comprising a rotary drum having a horizontal axis and mounted for rotation about said axis, means for supplying treatment fluid to said drum, fixed partition means located within said drum and providing therein a first series of axially spaced compartments of equal axial length, movable partition means located in said drum and providing a second series of axially spaced compartments of equal axial length, said first series of compartments registering with said second series of compartments and forming therewith a series of axially spaced treatment chambers, said movable partition means being axially displaceable through a distance equal to the axial length of said compartments.

13. Apparatus for the treatment of textile goods in which material to be treated is advanced intermittently through a succession of treatment chambers in counterflow to a treatment liquid, said apparatus comprising a rotary drum mounted for rotation about an axis, said axis being inclined to the horizontal, partition means dividing said drum axially into a plurality of separate treatment chambers in which successive treatment stages are performed, each said chamber having an inlet opening through which the material is received and an outlet opening through which the material is discharged, said partition means comprising a plurality of axially spaced perforate dividing walls, fluid supply means for supplying treatment liquid to the drum, and movable transfer means operable at the end of each treatment stage to inter-connect said inlet and outlet openings of adjacent chambers for effecting transfer of the material between successive chambers when the drum is rotated to a predetermined angular position.

14. Apparatus for the treatment of textile goods in which material to be treated is advanced intermittently through a succession of treatment chambers in counterflow to a treatment liquid, said apparatus comprising a rotary drum mounted for rotation about a substantially horizontal axis, said drum being partitioned axially into a plurality of separate treatment chambers in which successive treatment stages are performed, and fluid supply means for supply treatment liquid to said chambers, said chambers being defined by a series of axially spaced fixed partition members within the drum and a series of axially displaceable partition members each of which is adapted to register alternatively with a respective fixed partition member and an adjacent partition member.

*15. Apparatus for the treatment of textile goods in which material to be treated is advanced intermittently through a succession of treatment chambers and treated by a treatment liquid, said apparatus comprising a rotary drum having a horizontal axis and mounted for rotation about said axis, said drum being partitioned axially into a plurality of separate treatment chambers in which successive treatment stages are performed, each said chamber having an inlet opening through which the material is received and an outlet opening through which the material is discharged, fluid supply means for supplying treatment liquid to said chambers, and movable transfer means operable at the end of each treatment stage to inter-connect said inlet and outlet openings of adjacent treatment chambers for effecting transfer of the material between successive chambers when the drum is rotated to a predetermined angular position.*

*16. Apparatus for the treatment of textile goods in which material to be treated is advanced intermittently through a succession of treatment chambers and treated by a treatment liquid, said apparatus comprising a cylindrical drum having a horizontal axis, means mounting said drum for rotation about said axis, said drum being partitoned arially into a plurality of separate treatment chambers, means for supplying treatment liquid to said chambers, said partitioned drum consisting of a pair of complementary hemi-cylindrical drum portions, one said drum portion being axially slidable relatively to the other drum portion between a first axial position at which said treatment chambers are isolated from one another and a second axial position at which one half of each chamber is in registration with the complementary half of an adjacent chamber.*

References Cited

The following references, cited by the Examiner, are of record in the patented file of this patent or the original patent.

UNITED STATES PATENTS

| | | | |
|---|---|---|---|
| 3,352,131 | 11/1967 | Smith | 68—58 |
| 2,056,803 | 10/1936 | Failing. | |
| 2,337,137 | 12/1943 | Thompson et al. | |
| 3,103,802 | 9/1963 | Streich | 68—58 X |

FOREIGN PATENTS

| | | |
|---|---|---|
| 514,001 | 10/1939 | Great Britain. |

WILLIAM I. PRICE, Primary Examiner

PO-1050
(5/69)

UNITED STATES PATENT OFFICE
CERTIFICATE OF CORRECTION

Patent No. Re.26,874 Dated May 12, 1970

Inventor(s) Konrad Schäfer

It is certified that error appears in the above-identified patent and that said Letters Patent are hereby corrected as shown below:

Column 7, line 9, "apertures" should be --aperture --; Column 7, line 36, "compartment" (first occurrence) should be --compartments--; Column 8, line 46, "arially" should be --axially--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. Reissue No. 26,874 Dated May 12, 1970

Inventor(s) Konräd Schafer

It is certified that error appears in the above-identified patent and that said Letters Patent are hereby corrected as shown below:

Column 7, line 9, "aperture" should read -- apertures --; line 36, "compartment", first occurrence, should read -- compartments --. Column 8, line 46, "arially" should read -- axially --.

This certificate supersedes Certificate of Correction issued October 6, 1970.

Signed and sealed this 1st day of December 1970.

(SEAL)
Attest:

EDWARD M.FLETCHER,JR.
Attesting Officer

WILLIAM E. SCHUYLER, JR.
Commissioner of Patents